US008800359B2

(12) United States Patent
Furch et al.

(10) Patent No.: US 8,800,359 B2
(45) Date of Patent: Aug. 12, 2014

(54) DETERMINATION OF THE MUZZLE VELOCITY OF A PROJECTILE

(75) Inventors: Benjamin Furch, Rosrath (DE); Manfred Rüdiger, Troisdorf (DE)

(73) Assignee: Dynamit Nobel Defense GmbH, Burbach (DE)

( * ) Notice: Subject to any disclaimer, the term of this patent is extended or adjusted under 35 U.S.C. 154(b) by 344 days.

(21) Appl. No.: 13/259,348

(22) PCT Filed: Mar. 23, 2010

(86) PCT No.: PCT/EP2010/053769
§ 371 (c)(1),
(2), (4) Date: Dec. 6, 2011

(87) PCT Pub. No.: WO2010/108917
PCT Pub. Date: Sep. 30, 2010

(65) Prior Publication Data
US 2012/0085162 A1    Apr. 12, 2012

(30) Foreign Application Priority Data

Mar. 24, 2009   (DE) .......................... 10 2009 014 135

(51) Int. Cl.
*G01P 3/66*    (2006.01)
*F42C 17/00*   (2006.01)

(52) U.S. Cl.
USPC .............................................. 73/167; 89/6.5

(58) Field of Classification Search
USPC ......... 73/167; 324/179, 178; 701/3, 7; 89/6.5
See application file for complete search history.

(56) References Cited

U.S. PATENT DOCUMENTS

| 4,483,190 | A | * | 11/1984 | Cornett ............................ 73/167 |
| 4,574,238 | A | * | 3/1986 | Weinlich ........................ 324/178 |
| 4,649,796 | A | * | 3/1987 | Schmidt ............................ 89/6.5 |
| 4,672,316 | A | * | 6/1987 | Ettel .............................. 324/202 |
| 4,677,376 | A | * | 6/1987 | Ettel et al. ...................... 324/179 |

(Continued)

FOREIGN PATENT DOCUMENTS

| DE | 3407691 | 5/1990 |
| EP | 0 319 649 | 6/1989 |

(Continued)

OTHER PUBLICATIONS

International Preliminary Report on Patentability of International Application. No. PCT/EP2010/053769 dated Oct. 6, 2011 in English.

*Primary Examiner* — Helen Kwok
(74) *Attorney, Agent, or Firm* — Antonelli, Terry, Stout & Kraus, LLP.

(57) ABSTRACT

The invention relates to a method for determination of the muzzle velocity of a projectile (2) when it emerges from the firing barrel (1) of a shoulder-held weapon. In order not to weaken the firing barrel, it is proposed that a transmitter (3) for transmission of signals be arranged on the end face of the firing barrel (1) and that two sensors (9, 10), which are arranged at a distance d from one another, be arranged in or on the projectile (2) in order to detect the signals transmitted by the transmitter (3) and that these sensors (9, 10) detect a pulse on flying past the transmitter (3), and that the muzzle velocity for the projectile (2) be determined from the time difference between the pulses detected by the two sensors (9, 10).

15 Claims, 1 Drawing Sheet

(56) References Cited

U.S. PATENT DOCUMENTS

| | | | |
|---|---|---|---|
| 4,928,523 A * | 5/1990 | Muhrer et al. | 73/167 |
| 4,955,279 A * | 9/1990 | Nahrwold | 89/6.5 |
| 5,827,958 A * | 10/1998 | Sigler | 73/167 |
| 6,064,196 A * | 5/2000 | Oberlin et al. | 324/179 |
| 6,345,785 B1 * | 2/2002 | Harkins et al. | 244/3.23 |
| 6,563,302 B1 * | 5/2003 | Raposa et al. | 324/179 |
| 7,341,221 B1 * | 3/2008 | Wilson | 244/3.21 |
| 7,595,633 B2 * | 9/2009 | Martin et al. | 324/179 |
| 7,825,850 B2 * | 11/2010 | Frick | 342/115 |
| 8,176,667 B2 * | 5/2012 | Kamal et al. | 42/1.01 |
| 8,305,071 B2 * | 11/2012 | Frick | 324/160 |
| 8,433,460 B1 * | 4/2013 | Recchia et al. | 701/7 |
| 2004/0250615 A1 * | 12/2004 | Alberti et al. | 73/167 |
| 2006/0060692 A1 * | 3/2006 | Yehezkeli et al. | 244/3.21 |

FOREIGN PATENT DOCUMENTS

| | | |
|---|---|---|
| EP | 0 359 908 | 3/1990 |
| EP | 0 783 095 B1 | 11/2001 |
| EP | 1 598 631 A1 | 11/2005 |

* cited by examiner

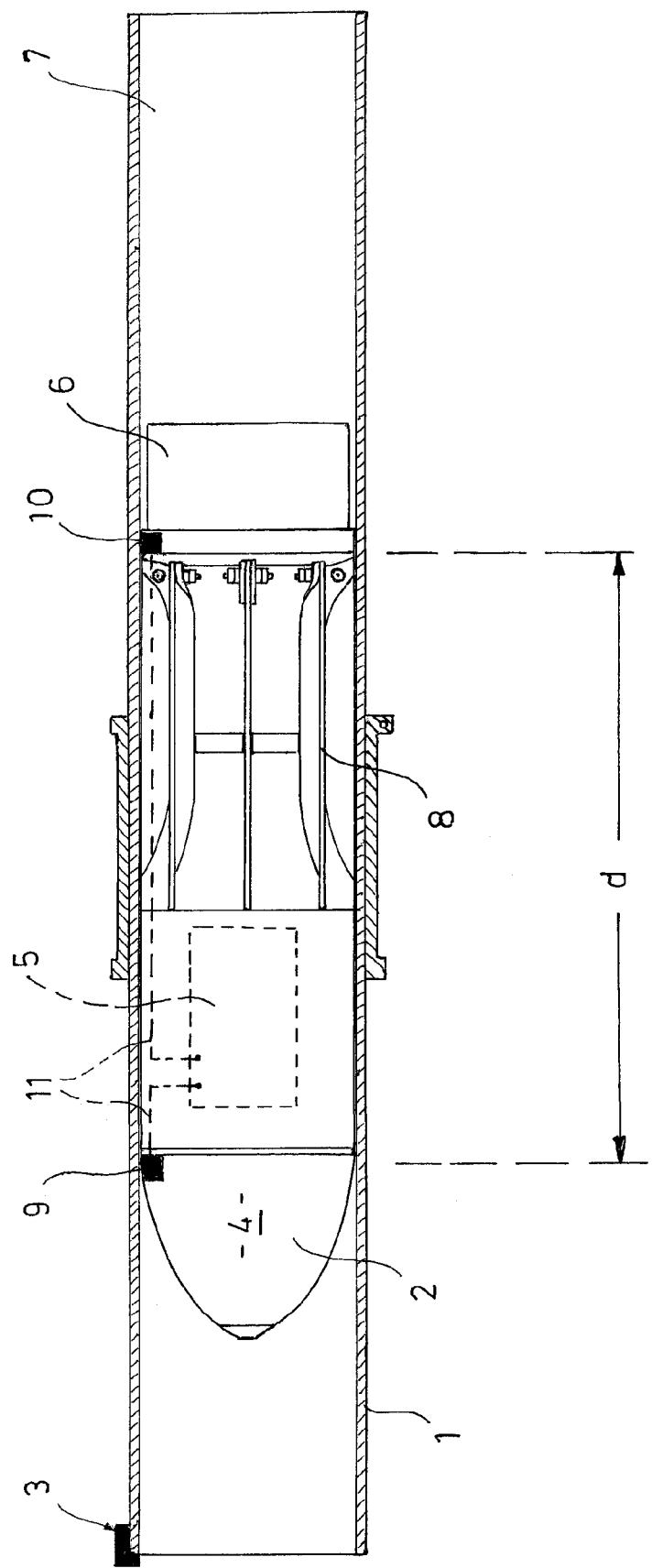

DETERMINATION OF THE MUZZLE VELOCITY OF A PROJECTILE

The invention relates to a process for determining the muzzle velocity in shoulder-launched weapons.

For an accurate and precise firing of ammunition from barrel weapons the accurate measurement of the muzzle velocity (Vo) is required. The knowledge of the muzzle velocity and the evaluation thereof improve the accuracy of fire of the ammunition.

With a view to accurate determination of the explosion-point or of the discharge-time in the case of submunition, the detonator has to know the muzzle velocity as exactly as possible.

BACKGROUND

In the previously known processes the measurement of the muzzle velocity is undertaken by an additional device which is fitted to the launching barrel of the barrel weapon. This device consists of a magnetic-field sensor, with a permanent magnet arranged in the projectile. By virtue of the movement of the projectile and hence of the permanent magnet in the launching barrel, a current is induced in the magnetic-field sensor. The velocity can be calculated from two measurements performed consecutively.

The following disadvantages arise from this:

1. The information pertaining to the muzzle velocity is initially available only in the external measuring device on the launching barrel and then has to be transferred to the detonator or to the detonator electronics in the projectile.

2. The transfer of the muzzle velocity is preferably effected in wireless manner, representing an additional technical effort.

3. In the case of shoulder-supported barrel weapons (hereinafter also called shoulder-launched weapons) the length, and in particular the weight, of the weapon is extended by the external measuring device. For ergonomic reasons an exceeding of the weight limit is no longer accepted nowadays. An exceeding of the length of the weapon may prevent stowability in personnel carriers.

4. An external measuring device requires an additional power supply, which increases the maintenance effort for weapons of such a type.

5. An external measuring device represents an additional logistical effort.

In EP 0 359 908 A1 a device for setting a time fuse of a projectile is described, the muzzle velocity of the projectile being measured, and the delay-time being corrected by the measured value of the muzzle velocity. For the purpose of ascertaining the muzzle velocity of the projectile the latter exhibits a magnetic-field sensor and the gun-barrel exhibits a first magnetic-field generator. In order to ascertain the projectile velocity very accurately with relatively little instrumental effort, it is proposed that a second magnetic-field generator be arranged on the gun-barrel, hereinafter also called the launching barrel, and that the receiving sensor be connected to a start-stop counter via an amplifier. The counter is started when the projectile flies past the second magnetic-field generator. The counter is stopped when the projectile flies past the first magnetic-field generator. The content of the counter then determines the timing-pulse frequency at which a preset downward counter is counted down.

DISCLOSURE OF THE INVENTION

A disadvantageous aspect of this procedure is that magnetic-field sensors are arranged in the launching barrel, flush with the inner surface. This weakens the launching barrel to such a considerable extent that it can rupture at the locations of the magnetic-field sensors that have been weakened in this way. Especially for shoulder-launched weapons, such as anti-tank weapons for example, with thin-walled launching barrels measuring only a few millimeters, this device cannot therefore be used.

The object underlying the invention is to specify a process and a device for determining the muzzle velocity of the projectile in shoulder-launched weapons, with which the launching barrel is not weakened.

In accordance with the invention this object is achieved in that a generator for emitting signals is arranged at the front end of the launching barrel and two sensors, arranged at a spacing d from one another, for detecting the signals emitted from the generator are arranged in or on the projectile and these sensors detect a pulse in the course of flying past the generator and the muzzle velocity of the projectile is determined from the time-difference of the pulses detected by the two sensors. By this means, the launching barrel is not weakened. In addition, the determination of the muzzle velocity is undertaken by the projectile itself. The measured velocity no longer has to be transferred separately into the projectile.

In one inventive configuration a magnetic-field generator, in particular a permanent magnet, is used as generator. Permanent magnets are inexpensive and are also easy to fasten to the front end. They must have such a strength that they can be detected by the sensors. It may be advantageous if the generators—or, to be more exact, the permanent magnets—encompass the front end in an annular manner—i.e. the projectile flies through the permanent magnet. Of course, use may also be made of several permanent magnets.

Magnetic-field sensors are preferably used as sensors. But, depending on the generator, use may also be made of other types of sensor. For example, it is conceivable to use ultrasonic generators. In this case, use has to be made of ultrasonic sensors.

In accordance with the invention the sensors are connected to the detonator electronics of the projectile via electrical cables and the detonator electronics calculate the muzzle velocity of the projectile and control the detonator accordingly. Under certain circumstances it may also be advantageous if the transfer to the detonator electronics is effected in wireless manner.

A shoulder-launched weapon according to the invention and projectile with a device for determining the muzzle velocity of the projectile upon emerging from the launching barrel, in particular for implementing the stated process, is characterised in that a generator for emitting signals is arranged at the front end of the launching barrel and two sensors, arranged at a spacing d from one another, for detecting the signals of the generator are arranged in or on the projectile and the sensors detect a pulse in the course of flying past the generator and the muzzle velocity of the projectile is determined from the time-difference of the pulses detected by the two sensors.

The generator is preferably a permanent magnet, and the sensors are preferably magnetic-field sensors.

In one inventive configuration the first sensor is arranged in the head of the projectile and the second sensor is arranged in the rear part of the projectile. For the purpose of improving the accuracy of measurement, the spacing d of the sensors should be as large as possible.

In one inventive configuration the second sensor is arranged between the fold-out wings and the propelling charge, since it can easily be incorporated there.

The sensors are preferably connected to the detonator electronics of the projectile via electrical cables. As already mentioned, the connection may also be effected in wireless manner.

In accordance with the invention the measurement of the muzzle velocity is undertaken by the projectile itself. This is obtained by virtue of the fact that a generator, in particular a magnetic-field generator, is arranged at the front end of the launching barrel and two spaced sensors, in particular magnetic-field sensors, which detect the field of the generator in the course of flying past are located on the projectile. The generator is preferably a permanent magnet.

On the projectile there are located at least two sensors (e.g. Hall sensor and/or induction coil). On the muzzle of the barrel there is located at least one generator (e.g. permanent magnet or an electromagnet) which is integrated into the structure of the weapon.

When the projectile exits the launching barrel a pulse is generated in each instance in the first sensor and in the second sensor by virtue of the fact that the sensors approach the generator. These two pulses are transferred directly to the detonator or to the detonator electronics. From the time-difference of the two pulses the detonator or the detonator electronics determine(s) the muzzle velocity, since the spacing d of the two sensors from one another is known.

Preferred is the use on a portable shoulder-launched weapon consisting of a launching barrel with propelling charge located therein and projectile. Located on the launching barrel is a firing mechanism (not shown in the FIGURE) with collapsible grips for transportation and with a likewise collapsible shoulder brace.

The invention will be elucidated further in the following on the basis of a FIGURE.

The single FIGURE shows a launching barrel 1 of a portable shoulder-launched weapon such as an anti-tank weapon, for example. A generator 3 is arranged at the outermost end of the launching barrel 1 at which the projectile 2 emerges upon detonation. This generator is, for example, a magnetic-field generator, but it may also be any other generator that generates a signal that can be detected by sensors 9, 10 which are located in or on the projectile 2. The magnetic-field generator is preferably a permanent magnet, but it may also be an electromagnet, for example.

The projectile 2 to be fired consists of a projectile head 4, detonation electronics 5 for detonating a detonator of a propelling charge 6, a counterbalancing mass 7 and swing-out wings 8.

In accordance with the invention two sensors 9, 10 that can detect the signal emitted by the generator 3 are arranged in or on the projectile 2. In this case these sensors 9, 10 are magnetic-field sensors that can detect the magnetic field of the generator 3 which in this case is a magnetic-field generator. The sensors 9, 10 are electrically connected to the detonator electronics via cables 11.

In a preferred embodiment the sensors 9, 10 are Hall sensors and/or an induction coil.

Upon detonation of the propelling charge 6 the projectile 2 is accelerated in the launching barrel 1. As soon as the first sensor 9 comes into the field of the generator 3, the sensor 9 detects a pulse and passes it on to the detonator electronics 5. This is then the beginning or start of the measurement of the velocity of the projectile 2. When the second sensor 10 comes into the field of the generator 3, this sensor likewise detects a pulse and passes it on to the detonator electronics 5. Since the spacing d of the two sensors 9, 10 is known, the muzzle velocity of the projectile results from the time-difference of the aforementioned two impulses. Since the generator is fastened to the front end of the launching barrel, its signal is not influenced by the metallic launching barrel, and precisely the muzzle velocity only is measured.

The invention claimed is:

1. A process for determining a muzzle velocity of a projectile upon emerging from a launching barrel of an anti-tank weapon, the projectile to be fired comprising a projectile head, detonator electronics for detonating a detonator of a propelling charge, a counterbalancing mass, and swing-out wings, characterised in that a generator for emitting signals is arranged at an outermost end of the launching barrel at which the projectile emerges upon detonation, and two sensors, arranged at a spacing d from one another, for detecting the signals emitted from the generator are arranged in or on the projectile and the sensors detect a pulse in the course of flying past the generator and the muzzle velocity of the projectile is determined from a time-difference of the pulses detected by the two sensors.

2. The process according to claim 1, characterised in that a magnetic-field generator is used as the generator.

3. The process according to claim 1, characterised in that magnetic-field sensors are used as the sensors.

4. The process according to claim 1, characterised in that the sensors are connected to the detonator electronics of the projectile via electrical cables and the detonator electronics calculate the muzzle velocity of the projectile and control the detonator accordingly.

5. The process according to claim 1, characterised in that the two sensors comprise a first sensor and a second sensor, and the second sensor is arranged between the swing-out wings and the propelling charge.

6. The process according to claim 1, characterised in that the magnetic-field generator is a permanent magnet.

7. An anti-tank weapon and a projectile with a device for determining the muzzle velocity of the projectile upon emerging from the launching barrel, in particular for implementing the process according to claim 1, characterised in that the generator for emitting signals is arranged at the outermost end of the launching barrel and the two sensors, arranged at the spacing d from one another, for detecting the signals of the generator are arranged in or on the projectile, and the sensors detect the pulse in the course of flying past the generator and the muzzle velocity of the projectile is determined from the time-difference of the pulses detected by the two sensors.

8. The anti-tank weapon and projectile according to claim 7, characterised in that the generator is a permanent magnet and the sensors are magnetic-field sensors.

9. The anti-tank weapon and projectile according to claim 7, characterised in that a first sensor of the sensors is arranged in the projectile head and a second sensor of the sensors is arranged in a rear part of the projectile.

10. The anti-tank weapon and projectile according to claim 9, characterised in that the second sensor is arranged between the swing-out wings and the propelling charge.

11. The anti-tank weapon and projectile according to claim 7, characterised in that the sensors are connected to the detonator electronics of the projectile via electrical cables.

12. A process for determining a muzzle velocity of a projectile upon emerging from a launching barrel of an anti-tank weapon, the process comprising:
each of two sensors of the projectile detecting separate signal pulses emitted from a generator arranged at an outermost end of the launching barrel at which the projectile emerges; and
determining the muzzle velocity of the projectile from a time-difference of the signal pulses detected by the two sensors, wherein the projectile further comprises a projectile head, detonation electronics for detonating a detonator, a counterbalancing mass, and swing-out wings, and the two sensors are arranged at a spacing d from one another in or on the projectile, and the two sensors detect the signal pulses in the course of flying past the generator.

13. The process according to claim 12, wherein the generator comprises a magnetic-field generator.

14. The process according to claim 13, wherein the magnetic-field generator is a permanent magnet.

15. The process according to claim 12, wherein the sensors comprise magnetic-field sensors.

\* \* \* \* \*